(12) United States Patent
Al-Mubarak

(10) Patent No.: US 9,038,787 B1
(45) Date of Patent: May 26, 2015

(54) COMPLEMENTARY BRAKING SYSTEM FOR A MOTOR VEHICLE

(71) Applicant: Adel A. E. Al-Mubarak, Hitteen (KW)

(72) Inventor: Adel A. E. Al-Mubarak, Hitteen (KW)

( * ) Notice: Subject to any disclaimer, the term of this patent is extended or adjusted under 35 U.S.C. 154(b) by 0 days.

(21) Appl. No.: 14/337,573

(22) Filed: Jul. 22, 2014

(51) Int. Cl.
*B60T 1/14* (2006.01)
*B60T 7/12* (2006.01)

(52) U.S. Cl.
CPC .... *B60T 1/14* (2013.01); *B60T 7/12* (2013.01)

(58) Field of Classification Search
CPC .................................. B60T 1/14; B60T 17/08
USPC ............................. 188/5, 8; 37/232, 233, 234
See application file for complete search history.

(56) References Cited

U.S. PATENT DOCUMENTS

| | | | |
|---|---|---|---|
| 1,805,933 A * | 5/1931 | Victor .............................. | 37/232 |
| 1,939,519 A * | 12/1933 | Porcelli ............................ | 188/5 |
| 2,240,399 A * | 4/1941 | Huntington ...................... | 188/5 |
| 2,871,986 A | 2/1959 | Polovitch | |
| 3,062,327 A | 11/1962 | Debus | |
| 3,831,689 A | 8/1974 | Smith | |
| 3,994,369 A | 11/1976 | Powaska | |
| 5,752,587 A | 5/1998 | Darling | |

FOREIGN PATENT DOCUMENTS

| GB | 1221658 A | * | 2/1971 |
| GB | 2470229 A | * | 11/2010 |

* cited by examiner

*Primary Examiner* — Thomas J Williams
(74) *Attorney, Agent, or Firm* — Lowe Hauptman & Ham, LLP

(57) ABSTRACT

A complementary braking system for removing liquids and solid debris from a motor vehicle's pathway and applying frictional contact in front of two or more of the motor vehicle's tires provide slowing and prevent further movement of the vehicle. The complementary braking system includes a resilient blade disposed forwardly of the motor vehicle's tires and above a road surface. The resilient blade includes an upwardly curved leading edge followed by a generally horizontal flat portion. The system also includes a pair of releasable latches that maintain the resilient blade in an elevated position until released to fall into contact with a road surface The system also includes a pair of electric motors for returning the resilient blade to an elevated latched position above the surface of the road in response to released pressure on the brake pedal.

3 Claims, 4 Drawing Sheets

COMPLEMENTARY BRAKING SYSTEM FOR A MOTOR VEHICLE

FIELD OF THE INVENTION

This invention relates to a complementary braking system for a motor vehicle and more particularly to a complementary braking system for removing liquid and debris from a motor vehicle's pathway and applying frictional contact in front of the motor vehicles front tires to prevent or slow further movement of the vehicle.

BACKGROUND FOR THE INVENTION

With many of today's high power engines and automatic transmissions the conventional hydraulic brakes are less than adequate particularly in inclement weather. Many of today's tires particularly those designed for racing have been designed for wet weather, however more conventional tires are far less suitable for high powered automobiles that are used under varying weather conditions.

In many premium priced automobiles anti-skid brakes are included in the base price of the vehicle. These brakes that automatically pump the brakes rapidly for improved stoppings are relatively effective. However, it is believed that there is still a need for an improved braking system particularly for use in wet weather. It is believed that there is a need for a system that is more effective in heavy rain. In the past there have been various approaches to provide an improved braking system for automobiles.

For example, a U.S. Pat. No. 3,062,327 of K. Debus discloses a process for producing an additional dynamic pressure on the road for rapid-braking of land vehicles. As disclosed in the patent, a wide endless belt is carried on rollers beneath a vehicle and movably supported so that it can be moved downwardly against a road surface. The rotation of the rollers is retarded and this produces the desired braking affect. In addition, the belt or band may be provided with a surface that enhances the frictional engagement of the band with the roadway.

A more recent U.S. Pat. No. 5,752,587 of Darling discloses an auxiliary braking system wherein a hydraulic arm is secured to a frame of the automobile. The hydraulic arm has a free end secured to the brake. The hydraulic arm has an up line and a down line extending outwardly therefrom. A pump is secured within the frame of the automobile. The pump is coupled with free ends of the up line and the down line of the hydraulic arm. The pump has wiring extending outwardly therefrom to couple with existing brake lines of the automobile.

Notwithstanding the above, it is presently believed that there is a need and a potential commercial market for a complementary brake system in accordance with the present invention. There should be a market for such devices because they offer improved braking during severe rain and poor braking conditions.

SUMMARY OF THE INVENTION

In essence, a complementary braking system for removing liquids and solid debris from a motor vehicle's pathway and applying frictional contact in front of two or more of the motor vehicle's tires either further slow the vehicle or prevent further movement of the vehicles.

The complementary braking system comprises or consists of a resilient blade disposed forwardly of the motor vehicle's tires and above a road surface. The resilient blade includes an upwardly curved leading edge followed by a generally horizontal flat portion. The leading edge and horizontal flat portion are both covered with a layer of a hard rubber compound in order to increase the friction when the blade is engaged with a road surface.

The system also includes a pair of releasable latches that maintain the resilient blade in a raised position out of contact with a road surface until released by pressure on the vehicle brake pedal. In addition to the above, a cylinder and piston are connected to a hydraulic activated brake system for releasing the latches and allowing the resilient blade to come into contact with the road surface.

Still further a pair of high impact springs may cushion the impact of the resilient blade contacting the road surface and impacts caused by bumps in the road. Still further the system includes a pair of electric motors for returning the resilient blade to an elevated latched position above the surface of the road in response to released pressure on a brake pedal.

A preferred embodiment of the invention contemplates a complementary braking system for moving liquids and solid debris from the motor vehicle's pathway and applies frictional contact in front of two of the motor vehicle's tires to prevent movement of the motor vehicle. The complementary braking system consists of a resilient blade disposed forwardly of the motor vehicle's two front tires and fixed to the motor vehicle's frames above a road surface and forwardly of the two front tires. The resilient blade includes an upwardly curved leading edge followed by a generally horizontal flat portion and wherein the resilient blade is made of steel and has a layer of a hard rubber compound on the lower surface of the leading edge and generally flat horizontal portion.

In a preferred embodiment of the invention the system includes a pair of releasable latches that maintain the resilient blade in a raised portion out of contact with a road surface until released by pressure on the vehicle's brake pedal. Still further, a pendulum including a metal ball for releasing the latches are activated in response to forward movement of the metal ball which is in response to the initial deceleration that allows the resilient blade to contact the road surface. Further, a pair of coil steel high impact springs and a pair of coil steel lower impact springs are provided for cushioning the impact of the resilient blade coming into contact with the road surface and the blade contacting bumps or other imperfections in the road surface. A pair of electric motors and hydraulic pumps are provided for returning the resilient blade to an elevated latched position above the surface of the road in response to released pressure on the brake pedal.

The invention will now be described in connection with the accompanying drawings wherein like elements have been identified with like numbers.

DESCRIPTION OF THE PREFERRED EMBODIMENTS OF THE INVENTION

Figure 1:
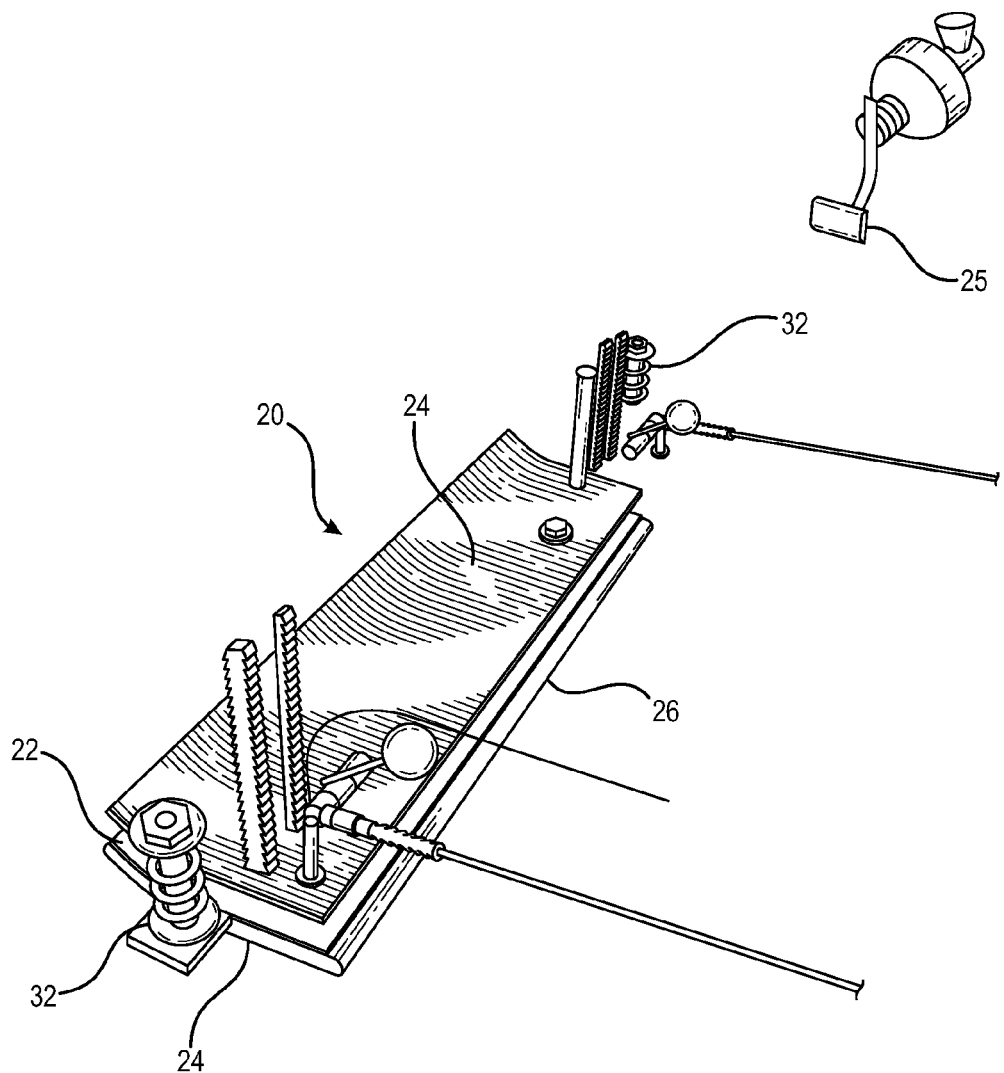
FIG. 1 is a schematic illustration of a resilient blade for contacting a road surface during a braking situation.
Figure 2:
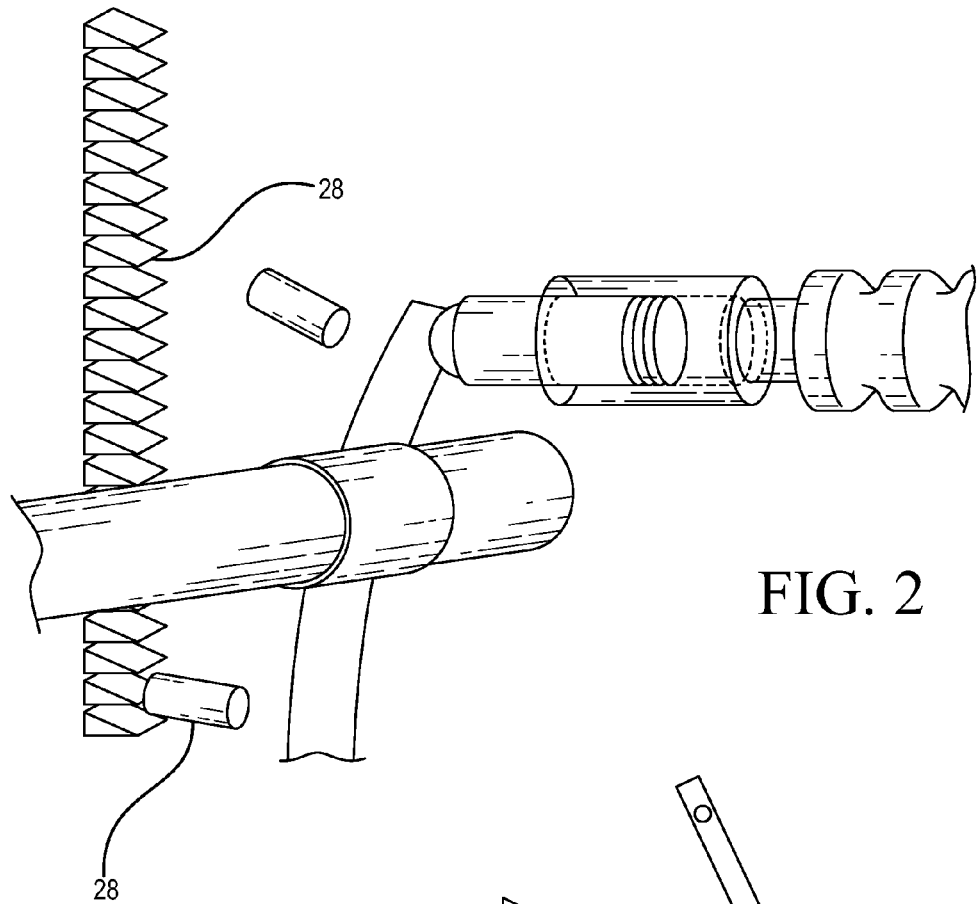
FIG. 2 is a schematic illustration of a latch release mechanism for applying the complementary braking system in accordance with the invention.
Figure 3:
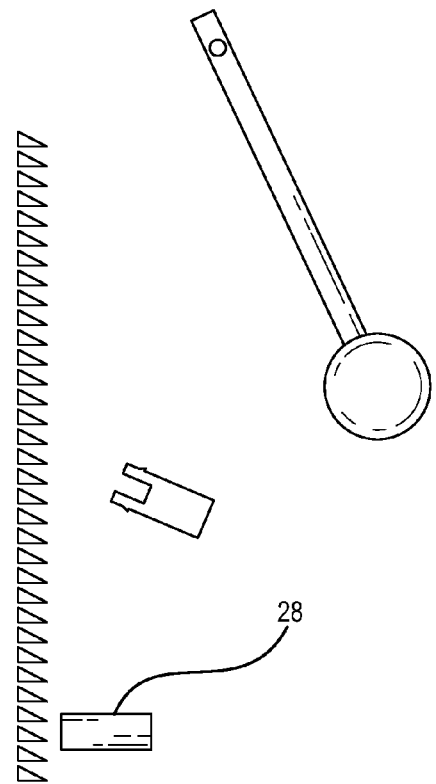
FIG. 3 is a schematic illustration of a pendulum with a metal ball as a weighted portion of the pendulum for actuating a complementary brake as disclosed above.
Figure 4:
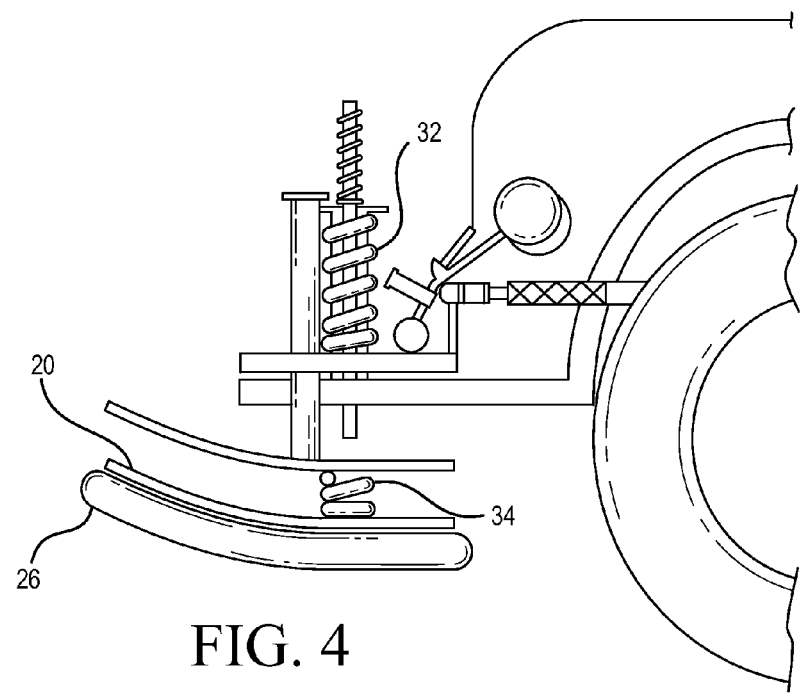
FIG. 4 is a schematic illustration of a resilient blade assembly as disclosed in FIGS. 1-3.
Figure 5:
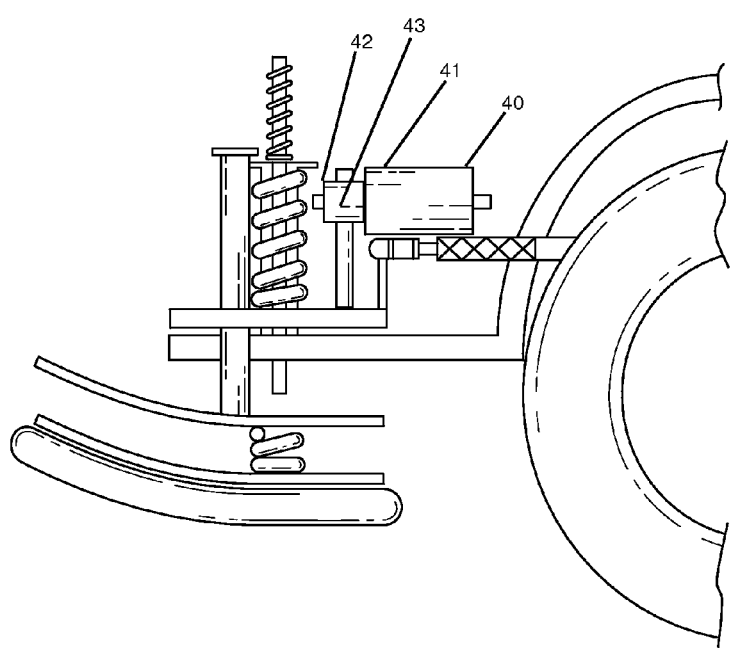
FIG. 5 is a schematic illustration of dual electric motors and two rack and pinion assemblies for returning the resilient blade to the position above the road surface.
Figure 6:
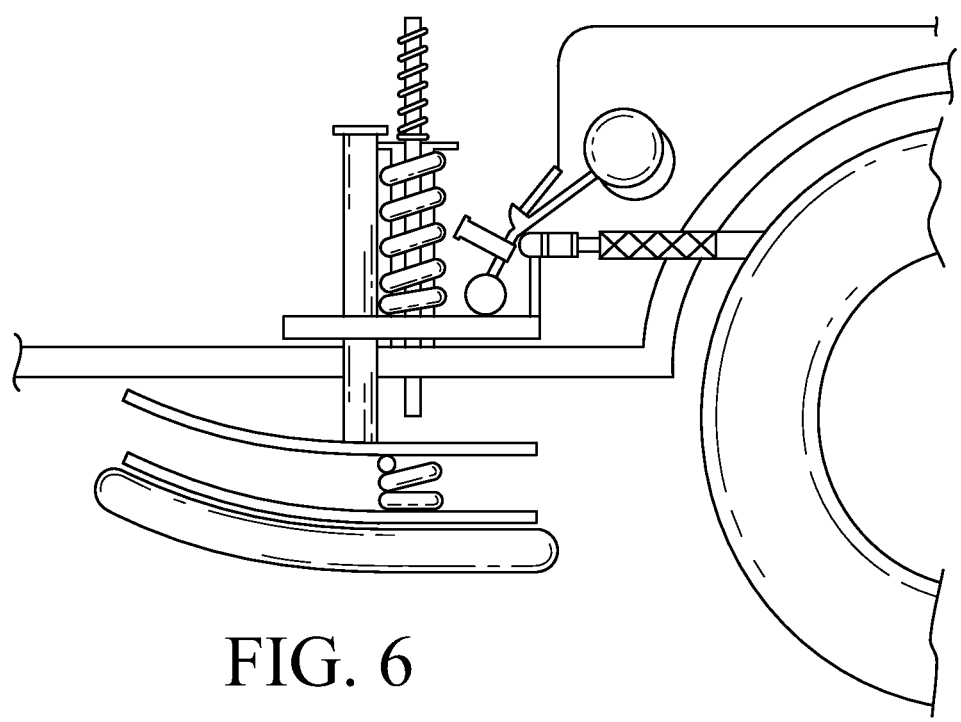
FIG. 6 is a schematic illustration illustrating a further embodiment of the invention.

Referring now to FIG. 1, a complementary braking system 18 for a motor vehicle in accordance to the present invention removes liquids and solid debris such as sand and dirt in front of the vehicle's tires. The braking system is particularly useful during heavy rain in that it removes the rainwater from in front of the braking tire so that it prevents aquaplaning or the slick surface of the road and allows the braking tires to be in close contact with the road surface.

To accomplish the above, the system includes a steel blade 20 that extends across the front of the vehicle forwardly of the front tires. The steel blade includes an upwardly curved leading edge 22 that is followed by a rectangular flat portion 24 that is disposed in a generally horizontal plane so that it is essentially parallel to the road surface. The width of the blade is wide enough to clear water and debris in front of the two front tires. It is also anticipated that a second system can be disposed in front of the rear tires for further braking efficiency.

A lower surface of the blade 20 includes a layer 26 of a hard rubber compound that extends across its width and covers the lower surface of the leading edge 22 and the flat rectangular portion 24 with a tread like surface. The length of the rectangular portion is limited by the distance between the leading edge 22 and the front tires. However, the distance of the system ahead of the rear wheels can be extended up to a better part of the distance between the front and rear wheels for increased frictional contact.

A pair of latch assemblies 28 maintains the steel blade 20 in an elevated position above a roadway until released by initiation of the braking system 18 by applying pressure to a brake pedal. Release of the latches 28 is activated by a cylinder and piston assembly 27 in response to an increase in hydraulic pressure caused by an individual's foot on the brake pedal 25. In a further alternative, the latches 28 are released in response to movement of a metal ball 29 that forms a lower part of a pendulum assembly 30.

The brake system 18 also includes a pair of high impact coil springs 32 that protect the system 18 and particularly the blade 20 from being damaged by bumps or imperfections in the road. Two smaller springs 34 ease the impact of the blade 20 coming into contact with the road as well as striking imperfections in the road.

The blade 20 is returned to its upper locked position by two electric motors 40 and 41 and two rack and pinion assemblies 42 and 43 with an appropriate gear train between the motors 40 and 41 to rack and pinion assemblies 42 and 43.

While the invention has been described in connection with its preferred embodiments, it should be recognized and understood that changes and modifications may be made therein without departing from the scope of the appended claims.

What is claimed is:

1. A complementary braking system for removing liquids and solid debris from a motor vehicle's pathway and applying frictional contact in front of two or more of a motor vehicle's tires to provide slowing and prevent further movement of the vehicle, said complementary braking system consisting of:
   a resilient blade disposed forwardly of the motor vehicle's tires, fixed to a motor vehicle's frame above a road surface and said resilient blade including an upwardly curved leading edge followed by a generally horizontal flat portion and wherein said resilient blade is made of steel and has a layer of a hard rubber compound on a lower surface of the leading edge and generally flat horizontal portion;
   a pair of releasable latches maintaining said resilient blade in a raised position out of contact with the road surface until released by pressure on a vehicle's brake pedal;
   a pendulum including a metal ball for releasing said latches in response to a forward movement of said metal ball in response to initial deceleration to allow said resilient blade to contact the road surface;
   a pair of coiled steel high impact springs and a pair of coiled steel lower impact springs for cushioning the impact of the resilient blade contacting the road surface and the blade contacting bumps in the road; and
   a pair of electric motors and hydraulic pumps for returning said resilient blade to an elevated latched position above the surface of the road.

2. The complementary braking system for removing liquids and solid debris from a motor vehicle's pathway and applying frictional contact in front of two or more of the motor vehicle's tires to provide slowing and prevent further movement of the vehicle according to claim 1, in which said pair of electric motors are operatively connected to a pair of rack and pinion assemblies and a gear train between said electric motor and said rack and pinion assembly.

3. The complementary braking system for removing liquids and solid debris from a motor vehicle's pathway and applying frictional contact in front of two or more of the motor vehicle's tires to provide slowing and prevent further movement of the vehicle according to claim 1, which includes a pair of low impact coil springs made of steel that complement said high impact coil springs.

* * * * *